Oct. 27, 1942.  B. P. GRAVES ET AL  2,299,817
MACHINE TOOLS
Filed Oct. 7, 1939  8 Sheets-Sheet 4
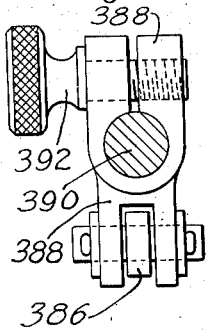
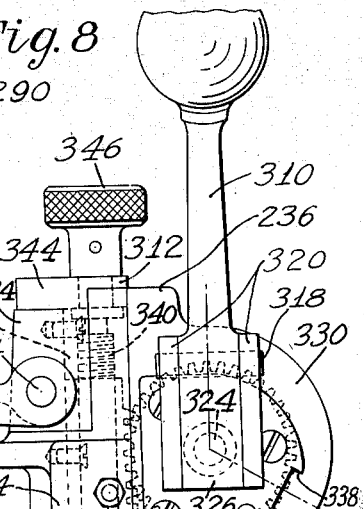
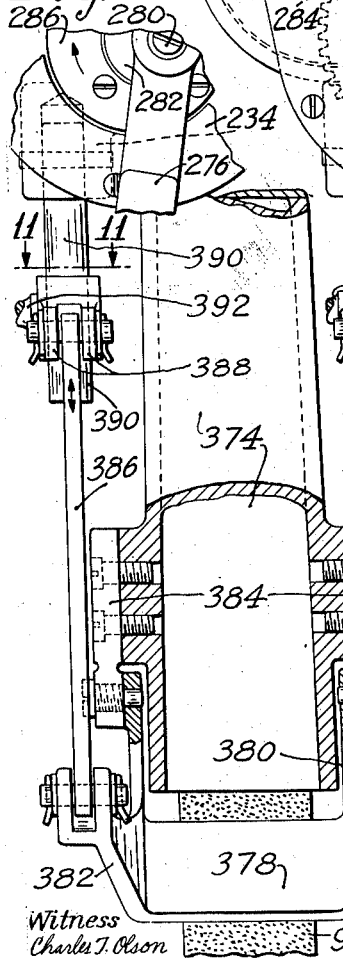
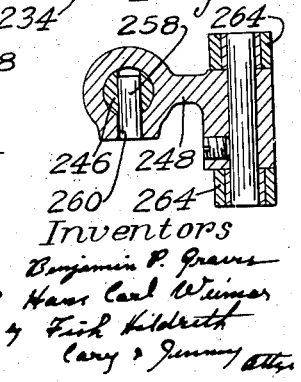

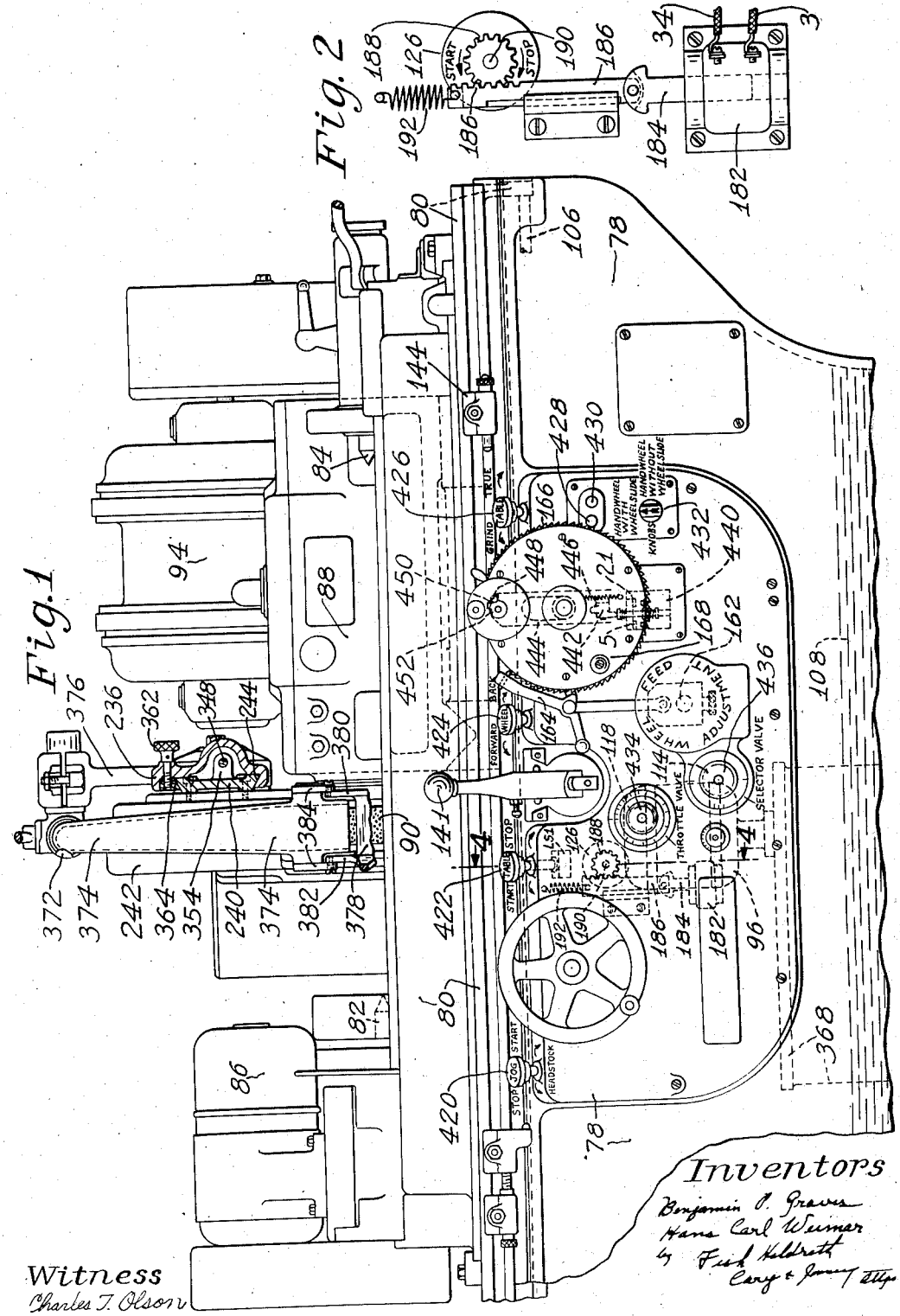

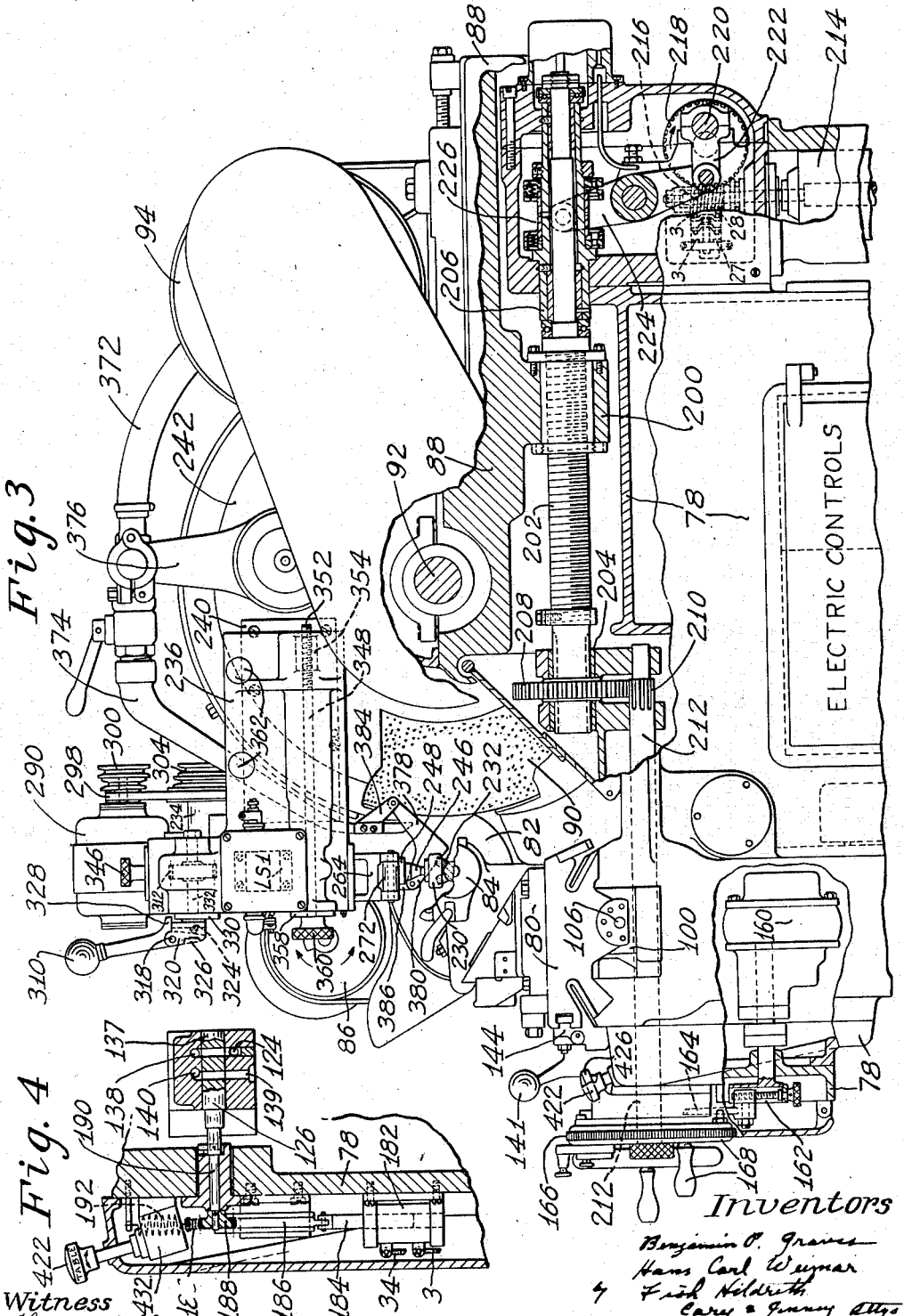

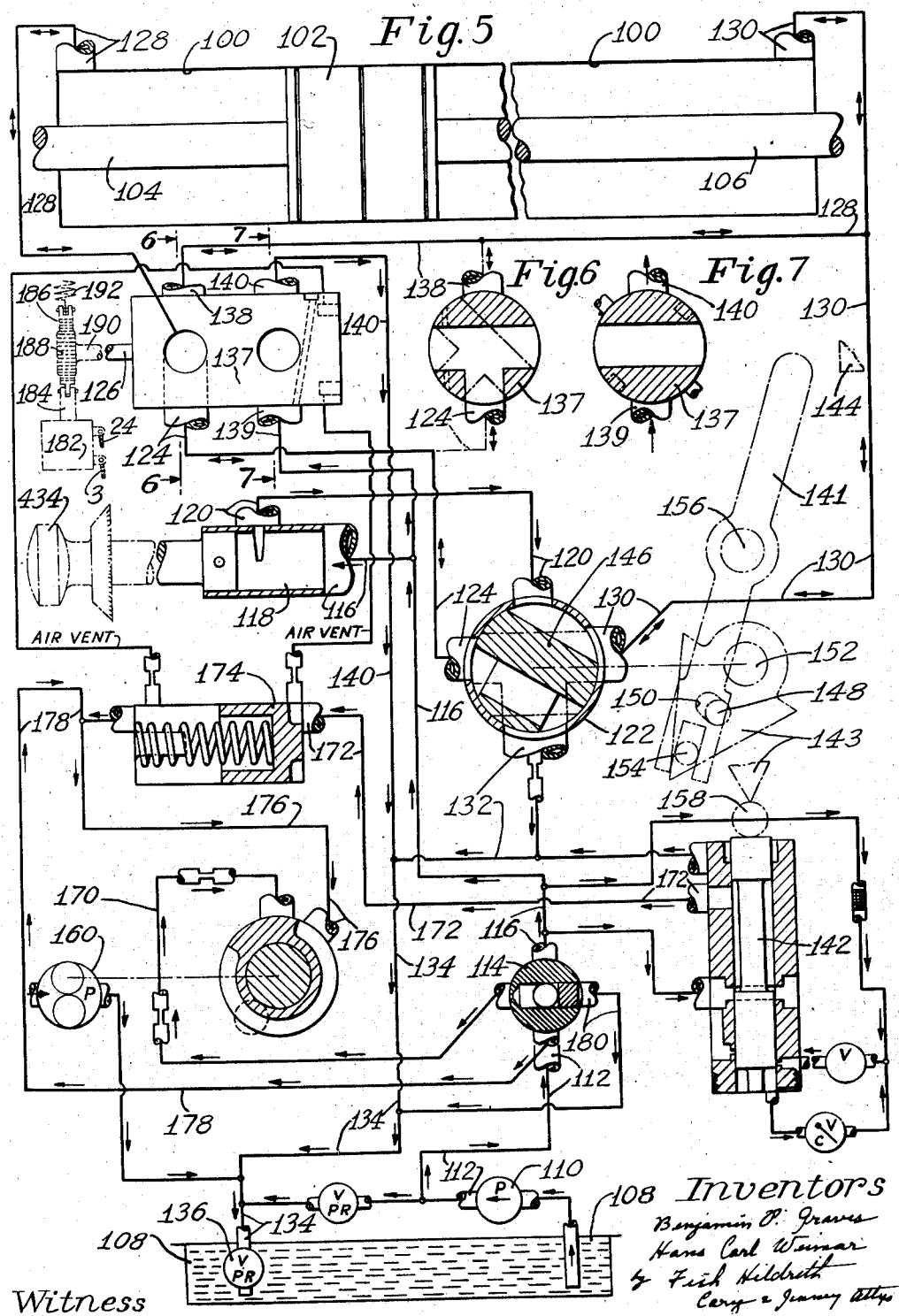

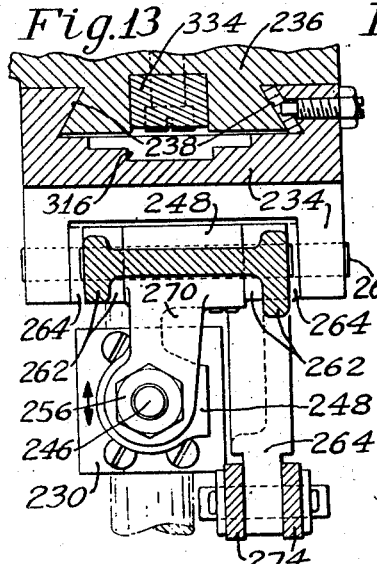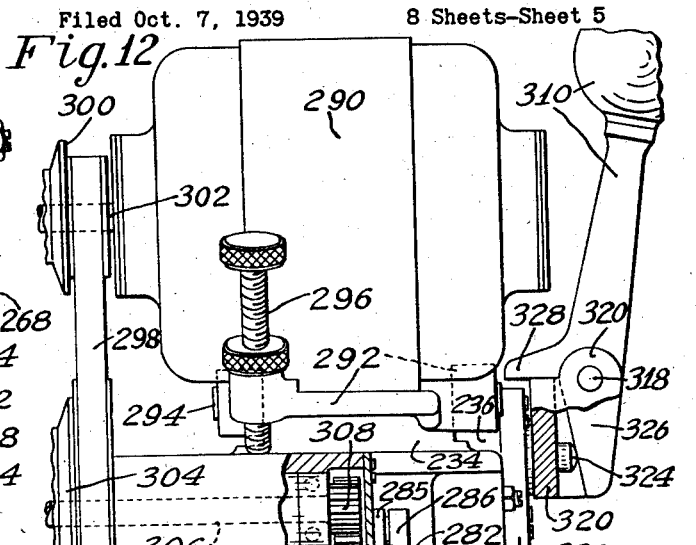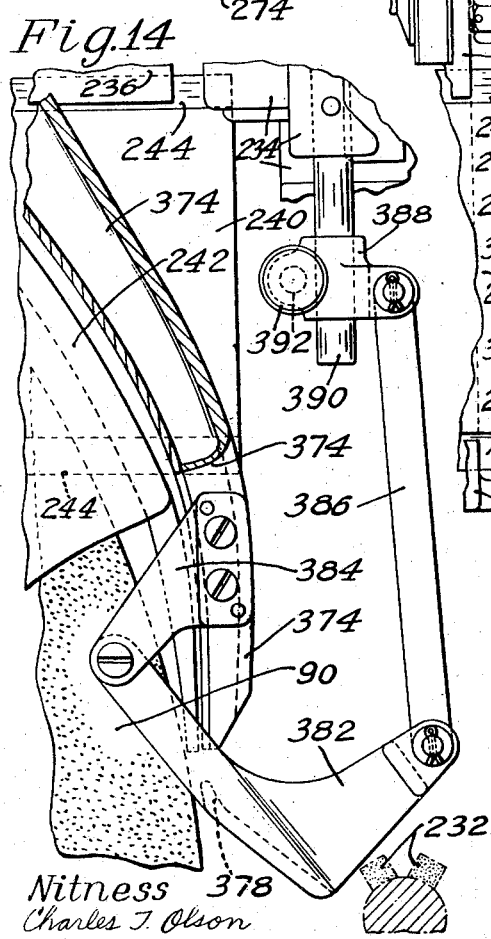

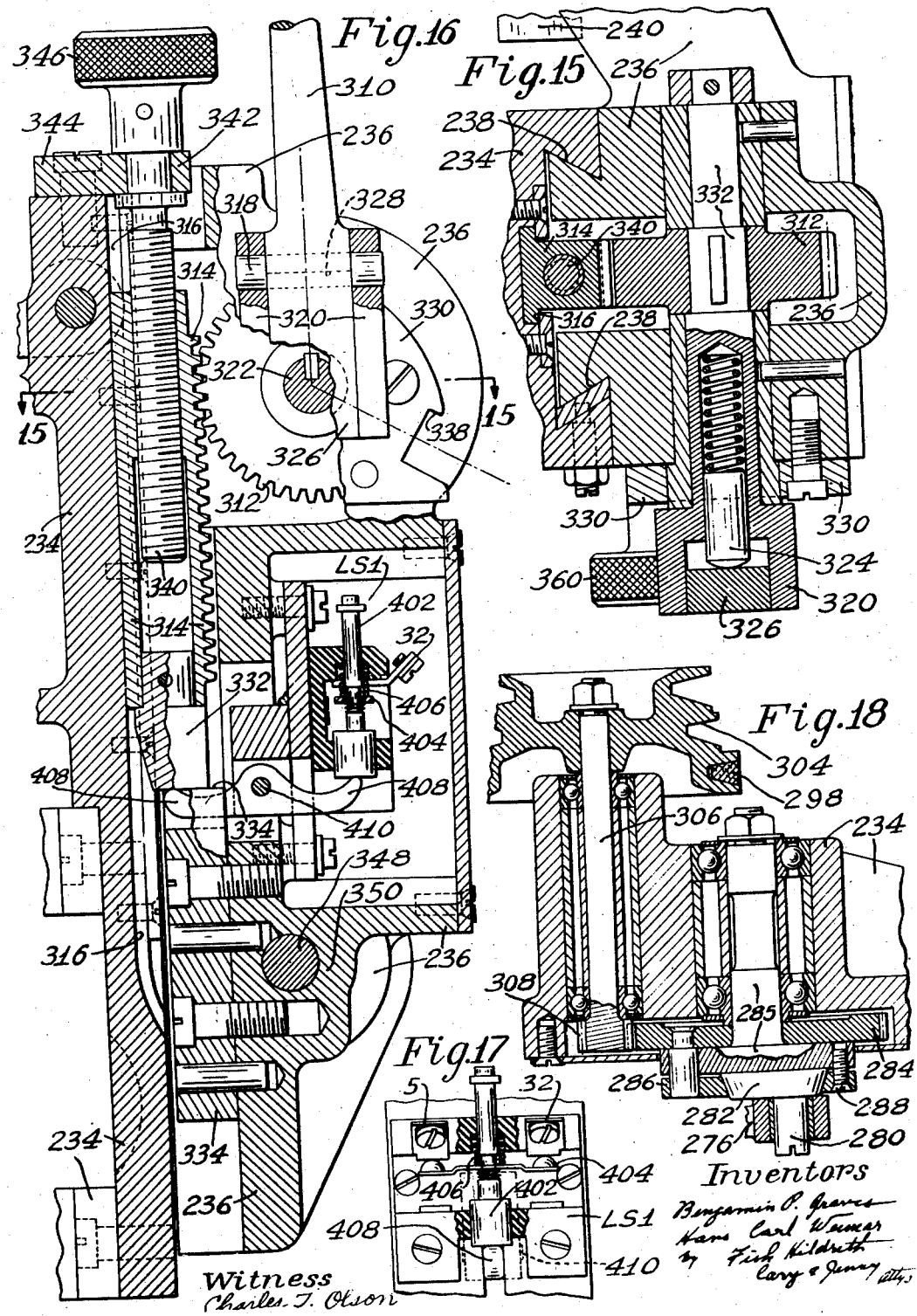

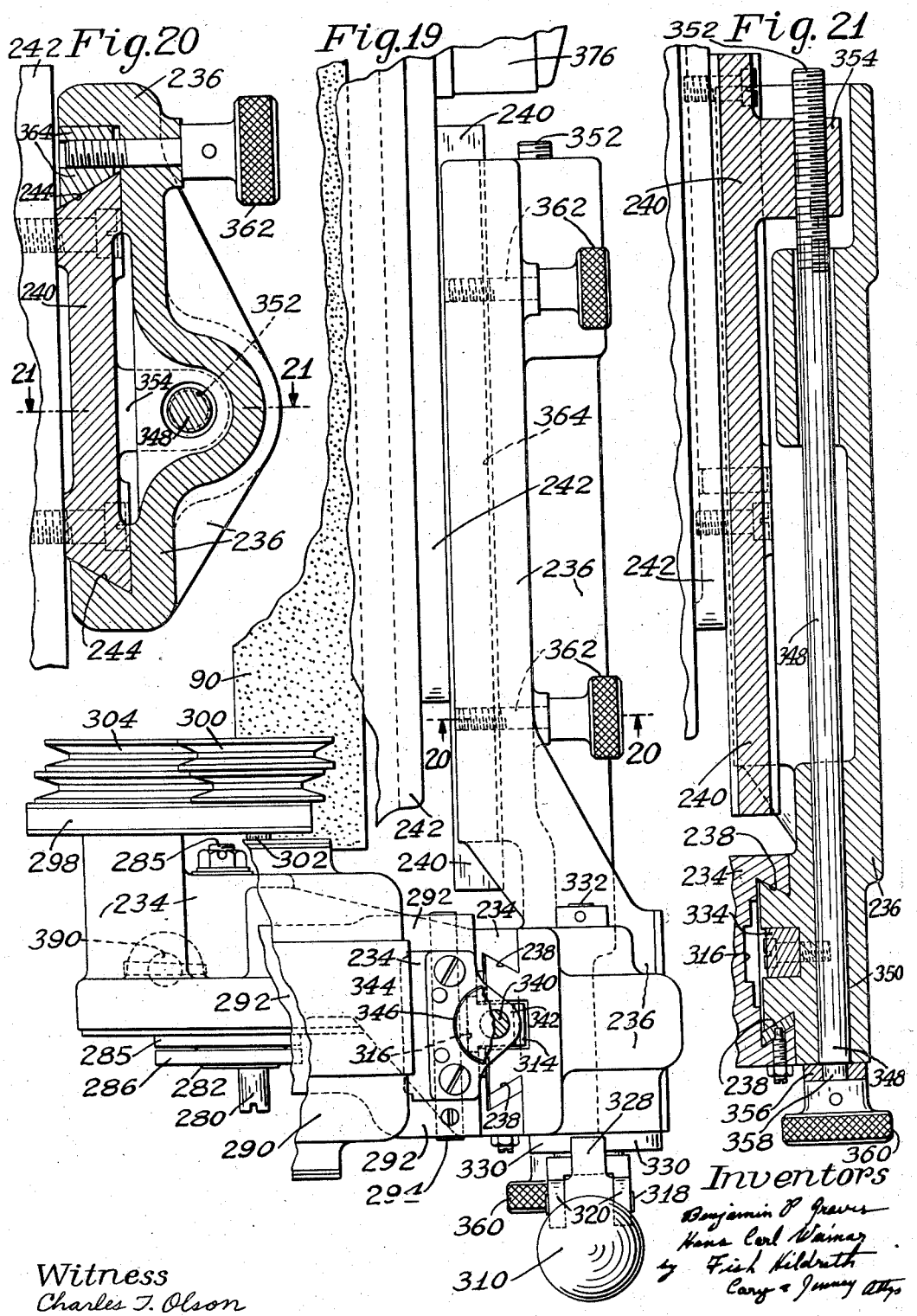

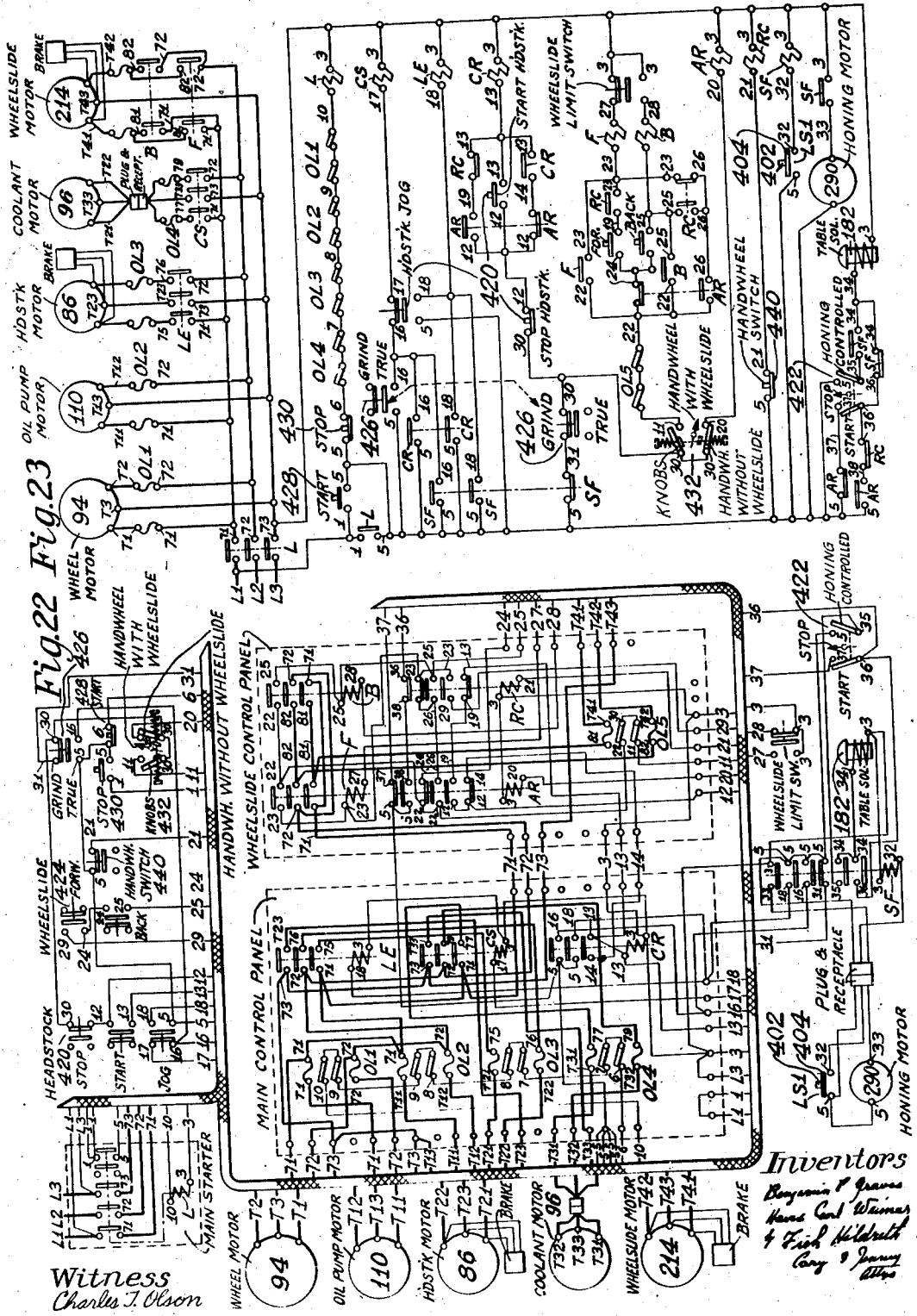

Patented Oct. 27, 1942

2,299,817

UNITED STATES PATENT OFFICE 2,299,817

MACHINE TOOL

Benjamin P. Graves, Barrington, and Hans Carl Weimar, Providence, R. I., assignors to Brown and Sharpe Manufacturing Company, a corporation of Rhode Island Application October 7, 1939, Serial No. 298,460

21 Claims. (Cl. 51—3)

The present invention relates to improvements in machine tools, and more particularly to the provision in a machine tool, of an improved honing attachment including control means well adapted to coordinate the operation of the attachment and the several operating instrumentalities of the machine.

In the illustrated embodiment of the invention, applicants' honing attachment is diclosed as embodied in a cylindrical type grinding machine including a work support having a rotary work holder mounted thereon, a grinding wheel spindle and a carriage support for the spindle, together with operating means for imparting relative transatory and cross feeding or positioning movements to the said supports, and control devices adapted for controlling the several operating parts of the machine both individually and in accordance with a number of automatic cycles, as hereinafter more fully set forth.

It is a principal object of the present invention to provide in a machine tool of the general type described, a honing attachment which will adapt the machine for the performance of a honing or finishing operation in addition to its usual operating functions.

It is a further object of the invention to provide in a machine tool of this general description embodying therein a honing attachment, a novel and improved system of operating controls for the machine including a honing control which may be rendered operative to control the several operating parts of the machine selectively in accordance with a honing cycle of operation.

It is another object of the invention to provide a novel and improved system of operating controls which is particularly well adapted for use in a cylindrical grinding machine of the general type disclosed having both electric and fluid motor driven parts to provide for a most efficient and versatile operation of these parts in accordance with a number of different manual and automatic operating cycles.

It is a further object of the invention to provide a novel and improved honing attachment which is rugged and simple in construction, and is well adapted for the efficient performance of a secondary honing or finishing operation on a work piece.

With these and other objects in view, as may hereinafter appear, the several features of the invention consist in the devices, combinations and arrangement of parts hereinafter described and claimed, which together with the advantages to be obtained thereby will be readily understood by one skilled in the art from the following description taken in connection with the accompanying drawings, in which Fig. 1 is a view in front elevation of a cylindrical grinding machine provided with applicants' improved honing attachment, the attachment itself being only partially shown in section for the more adequate illustration of underlying parts; Fig. 2 is an enlarged detail view in front elevation of the solenoid control of the table start and stop valve indicated in dotted lines in Fig. 1; Fig. 3 is a view in right side elevation of the grinding machine as shown in Fig. 1, with a portion of the casing broken away and underlying parts shown in section to illustrate particularly the grinding wheel cross feed and cross feed rapid movement; Fig. 4 is a detail sectional view of the switch knob for manual control of the table start and stop valve being taken on the line 4—4 of Fig. 1; Fig. 5 is a diagrammatic view of the hydraulic operating connections for controlling the operation of the work table and the power cross feed for the machine; Fig. 6 is a detail sectional view through the start and stop valve taken on the line 6—6 of Fig. 5; Fig. 7 is a detail sectional view of the start and stop valve taken on the line 7—7 of Fig. 5; Fig. 8 is an enlarged detail view in front elevation of the honing attachment; Fig. 9 is a detail sectional plan view taken on the line 9—9 of Fig. 8; Fig. 10 is an enlarged detail view partly in section and with a portion of the honing attachment broken away to illustrate particularly the device for deflecting coolant against the work and the honing attachment associated therewith; Fig. 11 is a detail sectional plan view taken on the line 11—11 of Fig. 10, illustrating particularly an adjustment in the mechanism for controlling the position of the coolant deflecting device; Fig. 12 is a detail view looking from the left showing substantially the parts of the honing attachment illustrated in Fig. 8; Fig. 13 is a detail sectional plan view taken on the line 13—13 of Fig. 12; Fig. 14 is an enlarged detail view partly in section looking from the left and illustrating substantially the parts shown in Fig. 10; Fig. 15 is a sectional plan view taken on the line 15—15 of Fig. 16; Fig. 16 is a detail sectional view in front elevation taken through the honing attachment and illustrating particularly the mechanism for raising and for lowering the honing attachment into operating position, the mechanism for adjusting the limits of vertical movement of the honing attachment, and the operating switch connection through which the several operating instrumentalities of the machine are controlled in accordance with a honing cycle of operations; Fig. 17 is a detail view partly in section of the operating switch shown in Fig. 16; Fig. 18 is a detail sectional plan view taken on the line 18—18 of Fig. 8, illustrating a portion of the driving mechanism for reciprocating the honing device; Fig. 19 is an enlarged plan view of the honing attachment with portions of the same broken away, and illustrating particularly the means for supporting the attachment on the grinding wheel guard plate; Fig. 20 is a detail sectional view in front elevation taken on the line 20—20 of Fig. 19; Fig. 21 is a sectional plan view taken on the line 21—21 of Fig. 20; Fig. 22 is a wiring diagram of the electrical connections for the machine; and Fig. 23 is an explanatory diagram of the electrical connections.

The invention as hereinafter disclosed, is embodied in a cylindrical grinding machine having a base 78, reciprocable work table 80, a rotary work holder comprising a headstock 82 and a tailstock 84 and an electric motor 86 for driving the headstock mounted on the table, a cross feed slide or carriage 88, a grinding wheel 90, a wheel spindle 92 and a spindle driving motor 94 supported on the cross feed slide 88, and coolant supply means including a coolant pump motor 96 for supplying coolant at the point of grinding contact. In the illustrated machine, control of the work table and of the power cross feeding movements of the wheel spindle carriage, is effected by means of hydraulically operated devices which are substantially those set forth in the patent to Maglott No. 2,163,246, dated June 20, 1939. The machine is additionally provided with a cross feed rapid movement for moving the grinding wheel carriage and grinding wheel rapidly through a predetermined distance toward and away from the work, which is substantially that illustrated and described in the patent to Mathewson and Krause No. 2,165,898, dated July 11, 1939, including a separate electric motor and driving connections therefrom for effecting a rapid movement of the cross feed slide between predetermined positions toward and away from the work.

The present machine is further provided with control devices adjustable to permit alternative manual and automatic control of the machine in accordance with a number of manual and automatic operating cycles. These controls are in many respects similar to those illustrated and described in the Mathewson et al. and Maglott patents above referred to, and include provision for continuous automatic operation of the work table for cylindrical grinding, a plunge cut control for plunge cut grinding, automatic handwheel control of the machine with and without cross feed rapid movement, and a truing control for controlling the several operating parts of the machine in accordance with a truing cycle of operations. A feature of the invention consists in the provision of novel electrical control devices adapted for electrically controlling the operation of the table and power cross feed fluid motors of the machine in accordance with certain operating cycles of which the machine is capable.

In carrying out the present invention, applicants have provided a honing attachment which is conveniently secured to the grinding wheel guard on the wheel spindle carriage, and comprises essentially a honing element having honing stones mounted therein arranged for engagement with one side of the work, and for rapid vibratory or reciprocatory movement axially of the work. In the illustrated form of the invention, the honing element and supporting and actuating mechanism therefor are mounted in a housing which is vertically movable between alternative lowered work engaging and raised inoperative positions. The holder is carried upon the lower end of a spring-seated spindle which is in turn supported upon a pair of parallel levers carried by the housing. The levers are connected through linkage connections to a motor driven crank which serves to impart a rapid vibratory movement to the parallel levers, the spindle supported thereby, and the honing element axially of the work.

Further in accordance with the invention, applicants' honing attachment is mounted on the cross feed slide and in such relation to the several operating parts of the machine as to provide an organization of the machine of maximum effectiveness for the performance of a honing operation, and which will not have the effect of obstructing or interfering with the usual operating functions of the machine. To this end the housing is supported for vertical movement on a horizontal slide member which is adjustably secured to guideways in a bracket on the wheel spindle guard. These parts are constructed and arranged so that the rapid movement of the wheel spindle carriage to its fully retracted position will cause the honing attachment including the holder to be located directly above the work in position to be lowered into work engaging contact. When the grinding wheel carriage is in its relatively advanced grinding position, the honing attachment will be located in a relatively advanced inoperative position in front of, and above the work on the machine.

In the illustrated construction, the mechanism for raising and lowering the housing and the vibratory honing device mounted thereon, comprises a hand lever movable between alternative fixed limiting positions, and having a rack and pinion operating connection with the housing. In order to provide for adjustment particularly of the low or work engaging position to which the honing device is moved by the movement of the hand lever as may be required by different diameters of work being operated upon, the rack is movably secured to the housing for vertical adjustment with relation thereto.

In order that coolant may be supplied to the point of contact of the honing device during the honing operation, at which time the grinding wheel carriage, grinding wheel and coolant attachment will have been moved to their fully retracted position, applicants have provided a coolant deflector which is rendered operative by movement of the housing and honing device supported therein to their low work engaging position to deflect the coolant stream forwardly from its usual direction with relation to the grinding wheel against the work and honing device engaging therewith.

Further in accordance with the present invention, operating connections are provided which may be rendered operative by movement of the honing device to its work engaging position to establish an operating control of the several co operating parts of the machine in accordance with a honing cycle of operations. In the illustrated construction, these connections include a switch which is arranged to be closed by the movement of the housing and honing device supported therein to the low work engaging position, and which acts through appropriate connections hereinafter more fully set forth, to control a number of operating functions of the machine. These functions may be briefly listed as follows to include the starting of the vibratory movement of the honing attachment, the starting of the headstock motor to rotate the work, the starting of the coolant motor to supply coolant to the point of contact, the movement of the table start and stop valve to start position to effect table reciprocation, and the disabling of the cross feed rapid movement and the various controls therefor to prevent movement of the grinding wheel carriage from its retracted position. At the same time the various manual and automatic controls which might cause the several operating parts of the machine to be operated in a manner inconsistent with the honing operation are rendered inoperative. The controls thus disabled include the headstock control knob, the wheel spindle slide rapid movement control knob, the grind-truing control knob, and the automatic hand wheel control switch.

Inasmuch as the hydraulic driving and control system for the work table and power cross feed is substantially identical with that fully illustrated and described in the Maglott patent above referred to, this system is illustrated diagrammatically in Fig. 5, and will be described only so far as is believed necessary to illustrate the connection of the present invention therewith.

As indicated in Fig. 5 of the drawings, the reciprocation of the table is effected by means of a fluid motor comprising a cylinder 100 rigidly mounted on the base 78, and a cooperating piston 102 having piston rod connections 104 and 106 with the table 80. Fluid pressure is supplied from a reservoir 108 by means of an oil pump (not shown) driven from an oil pump motor 110 (see Figs. 22 and 23), and passes upwardly through a conduit 112 to a cross feed selector valve 114, thence through a conduit 116, a throttle valve 118, and a conduit 120 to a reversing valve 122. From the reversing valve fluid pressure is directed alternatively by a conduit 124 through the start and stop valve 126 and conduit 128 to the left hand end of the cylindner 100, or through a conduit 130 to the right hand end of the cylinder 100. Fluid is exhausted alternatively from one end or the other of the cylinder 100 through the connections above described, to the reversing valve 122, and thence through conduits 132 and 134 and a low pressure exhaust valve 136 to the reservoir 108.

The start and stop valve comprises with the casing 126 a rotatable valve member 137 having alternative run and stop positions. During movement of the valve member to stop position, the conduit 128 is momentarily shut off locking the fluid in the left hand end of the table motor cylinder 100 to stop the table, and is then directly connected by a conduit 138 with conduit 130 and the right hand end of the cylinder 100. At the same time a by-pass connection is established through the start and stop valve between pressure and exhaust by way of extension 139 of pressure line 116 and extension 140 of exhaust line 134, so that the pressure in the entire system is dropped to the value maintained by the exhaust pressure valve 136. This drop in pressure has the effect of rendering the entire hydraulic system including the table fluid motor and the cross feed fluid motor inoperative.

The reversing valve 122 is arranged to be controlled by a reversing lever 141 through connections including a booster piston 142 and an arrowhead cam 143 which acts upon the shifting of the reversing lever 141 as, for example, by contact with reversing dog 144 to automatically and positively shift the reversing lever 141 and reversing valve 122 from one to the other position at the end of the table travel in each direction. The reversing valve 122 is of the rotary type having a rotatable valve member 146 which is connected with the arrowhead 143 by means of a lost motion connection including a pin 148 mounted on an offset arm on the valve member 146 for engagement in an elongated slot 150 in the arrowhead 143. The arrowhead turning on its axis generally indicated at 152, is connected by means of a pin and slot connection 154 to be moved with the reversing lever 141 turning on its axis 156. Upon each reversal, the reversing lever 141 acted upon by the reversing dog 144 is moved with the arrowhead 143 toward the alternate running position causing the arrowhead 143 to engage with an actuating roller 158 to depress the booster piston 142. The reversing valve is closed through the operation of the lost motion connection 148, 150 only after the reversing lever 141 and arrowhead 143 have moved somewhat past central position. The subsequent rise of the booster piston 142 and actuating roller 158 acts to shift the arrowhead 143, reversing lever 141 and reversing valve 146 to their fully reversed position.

Power cross feed for the machine is effected by means of a cross feed fluid motor 160, a cross feed crank 162 driven thereby (see Figs. 1 and 3), a cross feed pawl 164, and a ratchet 166 associated with the cross feed hand wheel 168. The cross feed motor 160 is arranged to be driven intermittently through increments of one revolution upon each reversal of the table, or continuously for plunge cut grinding as determined by the setting of the cross feed selector valve 114. The cross feed selector valve 114 above referred to, has three alternative positions including intermittent cross feed, continuous cross feed and cross feed stop positions.

For the intermittent cross feed position of the valve 114, fluid pressure is continuously supplied from the valve through a conduit 170 to the cross feed motor, but for the normal stop position of the motor, as shown in Fig. 5, is ineffective to start the same. Upon each reversal of the table, movement of the booster piston 142 causes fluid under pressure to be supplied therefrom through a conduit 172 to a starting piston 174 which in turn forces a small amount of fluid under pressure through conduit 176 to start the cross feed motor which then comes to rest at the end of one revolution in the position shown in Fig. 5. For this position of the selector valve 114, fluid under pressure is supplied therefrom through conduit 116 to drive the table fluid motor 100.

For the continuous cross feed position of the selector valve 114, the conduit 116 to the table fluid motor 100, and the conduit 170 to the cross feed motor are shut off, fluid pressure, however, being supplied from the selector valve through a conduit 178 and conduit 176 to continuously drive the cross feed motor.

For the stop position of the selector valve 114, both conduits 170 and 178 to the cross feed motor 160 are shut off. Fluid pressure is again admitted to the table motor supply line 116, and at the same time a connection is opened through an exhaust conduit 180, this connection, however, being sufficiently restricted to prevent any reduction in the pressure transmitted to the table motor from the required operating level.

As best shown in Figs. 1, 2, 4 and 5 of the drawings, the start and stop valve 126 of applicants' improved construction is arranged to be electrically controlled through connections which include a solenoid 182, the armature 184 of which is connected to a vertically movable rack member 186 meshing with a pinion 188 secured to a forward extension 190 of the start and stop valve member 126. A tension spring 192 connected to the rack member 186 tends normally to maintain the rack member 186 in a raised valve stop position.

The operating connections for imparting feeding and rapid movements to the wheel spindle cross feed slide 88 are those illustrated in the patent to Mathewson et al., but will be briefly described in connection with Figs. 1 and 3 of the drawings. The actuating connections referred to, comprise a nut 200 secured to the carriage 88 and having screw-threaded engagement with a cross feed screw 202 which is slidably supported in bearings 204, 206 on the base. A pinion 208 splined to a forward extension of the screw 202 meshes with a gear 210 formed on a shaft 212 which is connected at its forward end to be driven by the cross feed hand wheel 168. Cross feed rapid movements are imparted to the wheel spindle carriage 88 through connections which include a cross feed motor 214, a worm 216, worm gear 218, a crank 220 driven thereby, a link 222, and an actuating lever 224 having a sleeve connection 226 with the screw 202. As in the Mathewson and Krause patent above referred to, electrical connections are provided for driving and stopping the cross feed motor 214 to drive the crank 220 through successive increments of 180° to shift the feed screw 202 and wheel spindle carriage connected thereto through a predetermined distance to and from grinding position with relation to the work.

The honing attachment provided in accordance with the present invention, as generally shown in Figs. 1, 3 and 8 of the drawings, comprises a vibratory honing element 230 including honing stones 232, a housing 234 on which the honing element and its supporting and actuating mechanism is carried, a support 236 including guideways 238 on which the housing is vertically movable, and a bracket 240 secured to the usual grinding wheel guard 242 of the machine having horizontal guideways 244 (see Fig. 20) in which the support 236 is adjustably secured.

Supporting and actuating connections for the honing element 230, as best shown in Figs. 8, 12 and 13, comprise a vertical spindle 246 having at its lower end a tapered pin and socket connection with the honing element 230 providing a tiltable connection therewith. The spindle 246 is slidably mounted in a spindle support 248, and is pressed yieldingly downwardly by means of a compression spring 250 coiled about a reduced shank portion of the spindle between a shoulder 252 on the spindle and a shoulder 254 in the spindle support 248. Downward movement of the spindle in its support is limited by adjustable check nuts 256 screw-threaded to the upper end thereof, and arranged to bear against the abutting upper end of the spindle support 248. As hereinafter more fully set forth, the housing 234 and the honing device supported therein including the spindle support 248 are moved downwardly to an adjustable work engaging position in which the honing element 230 will be engaged against the work, and in which the spindle 246 will be forced upwardly to some extent against the pressure of the spring 250 to provide a spring-pressed contact between the honing element and work. The spindle 246 is keyed against rotational movements in its support by means of a pin 258 on the spindle which engages within a slotted portion 260 of the spindle support 248. The parts above described including the honing element 230, spindle 246, and spindle support 248 are supported for vibratory movements bodily substantially in the line of the axis of rotation of the work holder and work by means of two bell-crank levers 262 and 264 having pivotal supports 266 and 268 respectively in the housing 234. As seen, for example, in Fig. 8, the levers 262, 264 are located directly above one another in parallel position, having the downwardly extending arms thereof pivotally connected to lugs 270 and 272 formed on the spindle support 248. Links 274 connecting the laterally extending arms of the bell-cranks, cause these levers to move as a single unit.

A rapid oscillatory movement is imparted to the honing element 230 by means of a motor driven crank and link connection with the bell-crank levers 262, 264. Referring specifically to Figs. 8, 12 and 18, these connections comprise a link 276 bifurcated at its lower end to straddle the horizontal arm of the bell-crank and links 274, and connected thereto by a pivot pin 278. At its upper end the link 276 is pivoted on an eccentric pin or crank 280 formed in a rotatably adjustable circular disk 282 which is in turn eccentrically supported on the face of a driving gear 284 carried on a rotatable shaft 285. As best shown in Fig. 18, the eccentric disk 282 has a tapered peripheral edge which engages with a correspondingly tapered aperture in a clamping plate 286 which is carried on one face of the driving gear 284, and is rigidly clamped thereto by machine screws 288. With this construction it will be seen that the length of the crank arm provided by the eccentricity of the pin 280 with relation to the driving gear 284 may be readily adjusted to vary the amplification of the vibratory movements imparted to the honing element 230 by adjusting the angular position of the eccentric disk 282 with relation to the driving gear 284.

The driving gear 284 and crank pin 280 supported thereon are driven from an electric motor 290 supported on a bed plate 292 hinged at 294 to the upper face of the housing 234. An adjusting screw 296 formed on the outer edge of the bed plate 292 for engagement with the housing 234 provides convenient means for adjusting the tension on a driving belt 298 passing over a stepped pulley 300 on the armature shaft 302 of the motor, and over a stepped pulley 304 carried on a driven shaft 306 in the housing 234. A pinion 308 formed on the shaft 306 meshes with and serves to drive the gear 284 and crank pin 280.

The housing 234 and the honing device supported thereon are arranged to be moved through a predetermined distance between low work engaging and high inoperative positions through the operation of a manually operable control lever 310 and a pinion 312 carried on the support 236 for engagement with a rack 314 adjustably supported in a T-shaped slot 316 formed in the housing 234. The lever 310, as best shown in Figs. 8, 15 and 16, is pivotally supported for forward and back movements on a pivot pin 318 within a bifurcated bracket 320 formed on one end of a rock shaft 322 to which is also secured the pinion 312. A spring-pressed plunger 324 mounted in an axial recess in the shaft 322 abuts against a downwardly extending tail 326 of the lever 310 acting to maintain the lever 310 in an upright position in which a rearwardly extending abutment 328 thereof will engage against the peripheral edge of a latch plate 330. The control lever 310 is arranged to be moved through 120° between work engaging and inoperative positions. In the position shown, for example, in Figs. 8 and 16, with th lever in its raised or vertical position, the housing 234 and honing device supported thereon, will have been lowered to its low work engaging position, the extent of this downward movement being determined by the engagement of a block 332 secured to the lower end of the rack 314 with a stop surface 334 on the housing support 236. In order to raise the housing 234 and honing device to their inoperative position, the lever is moved downwardly through 120° to a limiting position determined by the engagement of the abutment 328 on the lever with one side of a recess 338 in the latch plate 330. The lever is now permitted to rock rearwardly about its pivot 318, causing the abutment 328 to move into latching position in the recess 338, thus locking the honing device in its raised inoperative position.

In accordance with one feature of the invention, an adjustment is provided for adjusting the downward limit of movement of the honing device to its work engaging position as determined by the throw of the control lever 310 and the seating of the rack 314 and block 332 against the stop surface 334. This adjustment is provided by means of an adjusting screw 340 screw-threaded into the upper end of the rack 314, and having a bearing 342 in a supporting plate 344 which is secured to the housing 234 and overlies the upper end of the T-shaped slot 316 for the rack. A knurled head 346 secured to the upper end of the adjusting screw 340 provides a convenient means for effecting this adjustment in the position of the rack 314 relative to the housing 234.

As best shown in Figs. 19 to 21 inclusive, the support 236 for the housing 234 is slidably supported on the bracket 240 on the wheel guard to permit adjustment of the honing attachment forwardly or rearwardly on the wheel spindle carriage 88, so that the honing device will be accurately placed above the axis of rotation of the work holder and work when the wheel slide rapid movement is rendered operative to retract the grinding wheel carriage 88 from grinding position to its fully retracted position away from the work. The mechanism for effecting this adjustment comprises a rearwardly extending rod 348 which is rotatably supported in a bearing 350 in the support 236 for the housing, and is provided at its rear end with a screw thread 352 engaging with a nut formed in a lug 354 on the bracket 244. The rod 348 is supported against axial movement with relation to the support 236 by means of a collar 356 which engages with the reduced forward end portion 358 of the rod 348 between the shouldered end of the reduced portion and a knurled operating knob 360 secured thereto. The support 236 is rigidly clamped in adjusted position by means of two clamping screws 362 rotatably mounted in the support 236, and having screw-threaded engagement with a clamping shim 364 contacting with the guideway 244.

In accordance with another feature of the invention, a simple and efficient device forming part of the honing attachment is provided for diverting the coolant stream forwardly from its usual direction against the grinding wheel to supply coolant to the point of honing contact when the wheel spindle carriage is in its fully retracted position for the performance of a honing operation. The present machine is provided with a coolant supply device which may be of ordinary description, and as best shown in Figs. 1, 3 and 14, comprises a coolant supply reservoir 368 in the base 78, a coolant supply motor 96 and pump (not shown) together with the supply line 372 terminating in a coolant supply nozzle 374 mounted on a bracket 376 on the wheel spindle guard 242. As will be readily evident from the drawings, the nozzle 374 is formed to direct a coolant stream against the grinding wheel at the point of grinding contact with the work, and is moved rearwardly with the grinding wheel to inoperative position. Applicants' deflector device for diverting the coolant stream forwardly against the work and honing device, comprises a deflector plate 378 and including side plates 380, 382 which extend upwardly and rearwardly of the plate 378 to provide supporting arms which are pivotally secured to brackets 384 mounted on opposite sides of the nozzle 374. The construction of the deflector device is such that when the device is moved upwardly about its pivot, the deflector plate 378 is moved forwardly to an inoperative position out of the line of the coolant stream from the nozzle 374. Downward movement of the deflector device to the position shown, for example, in Fig. 14, causes the plate 378 to be placed in the line of the coolant stream to deflect the same forwardly against the work and honing device. The deflector device is connected for movement with the housing 234 and honing device into and out of operative position. These connections comprise a link 386 connected at its lower end to an upwardly extending ear of the side plate 382, and at its upper end to an adjustable block 388 carried on a vertical shaft 390 secured to the housing 234. As best shown in Fig. 11 of the drawings, the block is of the split clamp type, being held in clamped position on the shaft 390 by means of a knurled headed clamping screw 392.

In accordance with the present invention, the control devices of the machine are arranged to include an operating switch which is arranged to be closed by movement of the housing and honing device supported therein to the low work engaging position to start operation of the machine in accordance with a honing cycle of operation. As best shown in Figs. 16 and 17 of the drawings, the honing switch generally designated as LS1 comprises an axially movable plunger 402 having mounted on the reduced portion thereof a switch contact cross arm 404 arranged to contact with connections 5—32. A compression spring 406 tends normally to maintain the plunger and switch arm in a low open position. The actuating connections for the switch comprise a switch lever 408 pivoted at 410 on the support 236 for the housing 234. One end of the switch lever 408 is arranged to engage beneath the switch plunger 402, and the other end enters a slotted portion of the abutment 334 for limiting the downward movement of the rack 314 and housing 234. Downward movement of the rack to its limiting position against the abutment 334 acts to rock the switch lever 408 in a counter-clockwise direction as illustrated in Figs. 16 and 17, to close the switch.

In order that the effect of the closing of the honing control switch LS1 to cause the machine to operate in accordance with a honing cycle of operation may be fully understood, the several operating controls of the machine will be briefly described in connection with the illustration of these controls in Fig. 1, and in the electrical wiring diagram Fig. 22 and explanatory diagram Fig. 23. The principal operating controls include a headstock control knob 420, a table start and stop control knob 422, a wheel spindle slide rapid movement forward and back control knob 424, and a grind-truing control knob 426. The machine is also provided with a start button 428, a stop button 430, and an automatic hand wheel control knob 432. Additional operating controls for the hydraulic table drive corresponding with those illustrated in the Maglott patent above referred to, include a throttle valve control knob 434 and a selector valve control knob 436.

The pressing of the machine start button 428, as will be clearly evident from an inspection of the explanatory diagram Fig. 23, operates to energize relay L, closing the main line switch to start the wheel motor 94 and the oil pump motor 110, and renders the headstock, coolant and wheel slide motors subject to the several operating controls. Contact L1—5 closes forming an interlock for the main switch coil, and also energizing the several electrical control circuits of the machine.

The headstock control knob 420 is constructed and arranged as in the Mathewson and Krause patent referred to, to be rotated in one direction to start the headstock, and in the opposite direction to stop the headstock, and to be moved axially downwardly to jog the headstock. The closing of the headstock start switch contact 12—13 energizes coil CR. Contact CR5—18 closes energizing coil LE to start the headstock, and contact CR5—16 closes energizing coil CS to start the coolant motor 86. Movement of the headstock control 420 in the opposite direction to open the headstock stop switch contacts 30—12, will act to de-energize relay coil CR and also coils LE and CS to stop the headstock and coolant motors.

The table start and stop control knob 422 in the present construction, is constructed and arranged to be rotatable in opposite directions from an intermediate stop position, rotation of the knob 422 in one direction acting to start the table motor, rotation in the other direction from said stop position acting to render the operation of the table subject to the honing control switch, as hereinafter more fully to be described. Movement of the table control knob 422 to "start" position closes the switch contact 37—36 to energize the table solenoid 182, causing the table start and stop valve 126 to be moved to running position. Return of the table control knob to "stop" position by opening switch contacts 37—36 de-energizes the table solenoid, and permits the return of the start and stop valve 126 to stop position, thus stopping the table, and rendering the entire hydraulic control system for the table and power cross feed inoperative as above described.

The grinding wheel rapid movement forward and back control knob 424 is arranged to be rotated in opposite directions to energize alternately coils F and B to start the wheel slide motor 214, and thereby to move the wheel spindle carriage from one to the other of its alternative forward and back positions. Inasmuch as these connections are substantially the same and operate in substantially the same manner as in the Mathewson and Krause patent above referred to, it is believed sufficient to say that movement of the control knob 424 in one direction acts to close contact For. 24—19, thus energizing coil F to start the wheel slide motor. At the end of 180° of rotation of the crank 220 driven by the wheel slide motor, the wheel slide limit switch designated in Figs. 22 and 23, is shifted mechanically to its alternate position, opening contact 27—3 to de-energize coil F stopping the wheel slide motor, and closing contact 28—3. Movement of the wheel slide rapid movement control knob 424 in the opposite direction, will act similarly by closing contact "back" 24—25 to energize B coil to start the wheel slide motor which is again automatically disconnected when the crank 220 has rotated through 180° by the return of the mechanically operated wheel slide limit switch to the position illustrated in Figs. 22 and 23.

The automatic hand wheel control knob 432 as best shown in Fig. 23, is rotatable to three alternative positions designated as Knobs, hand wheel with wheel slide, and Hand wheel without wheel slide. In the central "hand wheel with wheel slide" position, a circuit is established through the switch to the F and B coils to permit the operation of the wheel slide motor. An electrical circuit is also established through this switch to energize auxiliary coil AR which renders the automatic hand wheel control operative. In the "hand wheel without wheel slide" position of the switch illustrated in Fig. 23, coil AR is energized, rendering the automatic hand wheel control operative while the circuit through the F and B coils is broken, thus disabling the wheel slide rapid movement. In the alternative "knobs" position, a circuit is established through the F and B coils to permit operation of the wheel slide motor by the wheel spindle slide rapid movement control knob 424, relay AR, however, being de-energized to render the automatic hand wheel control inoperative.

The automatic hand wheel control above referred to, is substantially similar to that illustrated in the Mathewson and Krause patent above mentioned, but may be briefly described as follows in connection with Figs. 1, 22 and 23 of the drawings. This operating control comprises a switch 440 which is controlled by means of an actuating lever 442 and a vertically movable control slide 444 mounted immediately to the rear of the cross feed hand wheel 168. A spring 446 tends to maintain the control slide 444 in a raised position in which the control switch 440 is open. A stop pin 448 carried on the rear face of the cross feed hand wheel 168 is arranged for engagement with a stop surface 450 formed on one side of the control slide 444 at its upper end as the hand wheel reaches the limit of its movement counterclockwise in the direction of feed. When at the end of a grinding operation the hand wheel is moved in a reverse or clockwise direction to move the grinding wheel away from the work, the stop pin 448 will at the end of substantially one revolution of the hand wheel engage with a cammed stop surface 452 formed on the other side of the control slide 444, thus depressing the slide to close the hand wheel switch 440. Assuming that the automatic hand wheel control 432 is in its intermediate "hand wheel with wheel slide" position, movement of the hand wheel from its fully retracted position will cause the stop pin 448 to ride off of the stop surface 450 permitting the control slide 444 to rise, opening the switch 440 and de-energizing coil RC. The de-energizing of RC causes RC contact 38—36 to close, energizing the table solenoid to shift the table start and stop valve to running position. RC contact 19—23 opens, RC contact 23—26 closes energizing coil F to advance the wheel slide through its rapid movement, and RC contact 25—26 opens de-energizing coil B. RC contact 19—13 closes energizing auxiliary relay CR to start the coolant and headstock motors. When at the end of a grinding operation the cross feed hand wheel is moved in a clockwise direction to its fully retracted position, the engagement of the stop pin 448 with the cam stop surface 452 again closes the hand wheel switch contacts 5—21 energizing coil RC, thus reversing the operation of the electrical connections above described, to stop the coolant and headstock motors, to shift the table start and stop valve to its stop position, and by de-energizing coil F and energizing coil B, to move the wheel spindle slide to its fully retracted position.

The grind-truing control knob 426 is arranged for rotational movement between alternative "grind" and "true" positions. Movement of this knob to the "true" position operates to close the truing contacts 5—16 energizing coil CS to start the coolant motor. The contact 31—30 opens, thus de-energizing coil CR to prevent operation of the headstock motor, and deenergizing the cross feed rapid movement wheel slide motor 214 to prevent operation of the wheel slide rapid movement.

The arrangement and mode of operation of applicants' novel honing control which acts when rendered operative to cause the machine to operate in accordance with a honing cycle of operations, will now be described. For the purpose of this description, it will be assumed that the wheel slide has been moved to its retracted or separated position by operation of the wheel slide motor 214, and that the table start and stop switch has been moved to "honing controlled" position to provide for table reciprocation, and further that the cross feed selector valve control knob 436 has been moved to stop position, thus disabling the power cross feed. As previously set forth, movement of the control lever 310 to its upper limiting position, operates to move the housing 234 and the honing device supported thereby downwardly into work engaging contact. As these parts reach their limiting positions, the block 332 at the lower end of the rack 314 acts on the switch lever 408 to close the honing control switch LS1, energizing a relay coil SF. Contact SF35—34 closes energizing the table solenoid 182 to start the table reciprocation. Contact SF36—34 opens disabling automatic hand wheel control of the table. Contact SF5—31 opens de-energizing relay coil CR and the headstock control knob. Opening of contact SF5—51 also de-energizes coils F and B, thus disabling the cross feed rapid movement. Contact SF5—18 closes energizing coil LE to start the headstock motor, and contact SF5—16 closes energizing coil CS to start the coolant motor. The electrical connections above described are so constructed and arranged as to cause these operations to take place independently of the position of the grind-true control knob 426, the wheel spindle rapid movement control knob 424, the headstock control knob 420, and the automatic hand wheel control knob.

In the event that it is desired to perform a honing operation on a work piece without table reciprocation, it is necessary only to shift the table start and stop switch to stop position. The operation is then as above described, except that the closing of SF contact 35—45 has no effect to energize the table solenoid 182.

While the present invention has been particularly illustrated and described in connection with a cylindrical grinding machine, it will be understood that certain features of the invention relating particularly to the honing attachment, are not limited in their application to a circular grinding machine, but may be more broadly applicable to other types of machine tools having relatively movable tool and work supports to which applicants' honing attachment could be readily applied.

Features of applicants' invention relating specifically to the construction and arrangement of the honing attachment per se, form the subject-matter of a divisional application Serial No. 401,190, filed July 5, 1941, for Machine tools.

It will be understood that the invention is not limited to the specific embodiment shown, and that various deviations may be made therefrom without departing from the spirit and scope of the appended claims.

What is claimed is:

1. In a grinding machine, a work support and a rotary work holder thereon, a grinding wheel support, and operative means for rotating the work holder and for effecting relative translatory movements and transverse positioning movements of said supports between grinding and relatively separated positions, a honing attachment located on said grinding wheel support to be rendered operative in the relatively separated positions of said supports, said honing attachment comprising a vibratory honing element and supporting means on which the honing element is movable into and out of work engaging contact, control means for operating said work supports and work holder for effecting a grinding operation, means for vibrating the honing element, and an operating control rendered operative automatically concurrently with the movement of the honing element against the work to control the operation of the supports, the work holder, and honing element in accordance with a honing cycle of operation.

2. In a grinding machine, a reciprocable work support, a rotary work holder thereon, a grinding wheel and a grinding wheel support movable toward and away from the work holder, power means for reciprocating the work support, power means for rotating the work holder, a cross feed including a cross feed power rapid movement for moving the grinding wheel support between grinding and separated positions, power means for supplying coolant to the point of operation on the work, means including manually operable controls for controlling the operation of said several power operated parts for effecting a grinding operation, a honing attachment mounted on said grinding wheel support to be rendered operative for the separated position of the grinding wheel support, said honing attachment comprising a vibratory honing element and housing movable with relation to the grinding wheel support into and out of work engaging contact, power means for imparting vibratory movement to said honing element, and control means rendered operative automatically concurrently with movement of the housing to work engaging position to control said several power operated parts in accordance with a honing cycle of operation.

3. In a grinding machine, a reciprocable work support, a rotary work holder thereon, a grinding wheel and a grinding wheel support movable toward and away from the work holder, power actuating means for the parts comprising the work support, work holder, and grinding wheel support, control means including manually operable controls for operating said parts in accordance with a plurality of operating cycles for grinding, a honing attachment comprising a honing device movable into and out of work engaging contact, and control means rendered operative automatically concurrently with movement of the honing device to work engaging position for controlling said parts in accordance with a honing cycle of operation.

4. In a grinding machine, a reciprocable work support, a rotary work holder thereon, a grinding wheel and a grinding wheel support movable toward and away from the work holder, means for supplying coolant to the point of operation on the work, actuating means including control devices for controlling the operation of each of said work support, work holder, and coolant supply means for effecting a grinding operation, a honing attachment comprising a vibratory honing element movable between work engaging and retracted positions, actuating means for the honing element, a manually operable control for moving the honing element between said alternative positions, and a control device rendered operative automatically concurrently with the movement of the honing element to work engaging position to start in operation each of said work support, work holder, coolant supply means and vibratory honing element.

5. In a grinding machine, a reciprocable work support, a rotary work holder thereon, a grinding wheel, and a grinding wheel support movable toward and away from the work holder, means for supplying coolant to the point of operation on the work, a honing attachment comprising a vibratory honing element, power means for operating the parts comprising the work support, work holder, coolant supply means and vibratory honing element, means for controlling the operation of said supports, work holder and coolant supply means to effect a grinding operation, a manually operable honing control element for the machine, and control devices rendered operative by the actuation of said honing control element for simultaneously starting and for stopping the operation of each of said power operated parts.

6. In a grinding machine, a reciprocatory work support, a rotary work holder thereon, a grinding wheel and a grinding wheel support movable toward and away from the work holder, coolant supply means, a honing attachment mounted on the grinding wheel support comprising a vibratory honing element and a housing arranged for a retracted position of the grinding wheel support to be moved on the support between work contacting and inoperative positions, power actuating means for effecting movement of each of said supports including a cross feed power rapid movement for moving the grinding wheel support between grinding and said retracted positions, an electrical control system for the machine comprising a manual control and switch connections for starting and stopping the rotary work holder and coolant supply means, a manual control and switch connections actuated thereby to start and stop reciprocation of the work support, a manual control and switch connections controlled thereby for effecting rapid movement of the grinding wheel support, a grind-truing control and switch connections controlled thereby for controlling the machine in accordance with a truing cycle of operation, a cross feed hand wheel and an automatic hand wheel control including switch connections for controlling the operation of the machine in accordance with an automatic cycle of operations, and a honing control operable to start the honing attachment in operation and simultaneously to start the rotary work holder and the coolant supply means, and to render said cross feed rapid movement and automatic hand wheel control, inoperative independently of the position of said manual controls.

7. In a grinding machine, a reciprocatory work support, a rotary work holder thereon, a grinding wheel and a grinding wheel support movable toward and away from the work holder, coolant supply means, a honing attachment mounted on the grinding wheel support comprising a vibratory honing element and a housing arranged for a retracted position of the grinding wheel support to be moved on the support between work contacting and inoperative positions, power actuating means for effecting movement of each of said supports including a cross feed power rapid movement for moving the grinding wheel support between grinding and said retracted positions, and an electrical control system for the machine comprising a manual control and switch connections actuated thereby for controlling reciprocation of the work support having alternative start, stop and honing controlled positions, a cross feed handwheel, and an automatic handwheel control including switch connections for controlling the operation of the machine in accordance with an automatic cycle of operations, and operative for the start and stop positions of the work support control to control reciprocation of the work support, and a honing control operable to start the honing attachment in operation including switch connections operative for the honing controlled position of the work support control to start and stop the table reciprocation simultaneously with the starting and stopping of the honing attachment, and operative for the start and stop positions of the work support control to prevent reciprocation of the work support.

8. In a grinding machine having a reciprocable work support, a rotary work holder thereon, a grinding wheel and a grinding wheel support movable toward and away from the work holder, power means including an electric motor for effecting a relative rapid movement of said supports of predetermined extent between grinding and separated positions, a honing attachment located on the grinding wheel support in position for engagement with the work in the separated position of said supports, said honing attachment comprising a vibratory honing device including an electric motor, and a housing movable between work contacting and raised inoperative positions, a manually operable lever and connections manually operated thereby for shifting the honing device between said positions, and an electrical control system for the machine including a switch connection arranged to be actuated by movement of the honing device to work contacting position to energize said honing motor and simultaneously to disable said rapid movement motor.

9. In a grinding machine, the combination of a work support, a rotary work holder thereon, a grinding wheel, a grinding wheel support, means for effecting relative transverse movements of said supports for moving the grinding wheel to and from grinding position with respect to the work holder, a honing attachment located on the grinding wheel support to be rendered operative for a relatively separated position of said grinding wheel and work holder, said honing attachment comprising a honing device movable on the grinding wheel support into and out of work engaging position, a coolant supply device including a device on the grinding wheel support for directing a coolant stream against the grinding wheel, shifting means for moving the honing device to work engaging position, and means actuated by said shifting means for deflecting the coolant stream against the work at the point of honing contact.

10. In a grinding machine, the combination of a work support, a rotary work holder thereon, a grinding wheel, a grinding wheel support, means for effecting relative positioning movements of said supports between grinding and relatively separated positions, a honing attachment located on the grinding wheel support to be rendered operative for a relatively separated position of said grinding wheel and work holder, said honing attachment comprising a honing device movable on the grinding wheel support into and out of work engaging contact, a coolant supply device including a nozzle on the grinding wheel support for directing a coolant stream against the grinding wheel, a device for deflecting the coolant stream, means for moving the honing device to work contacting position, and means rendered operative by movement of the honing device to work contacting position for actuating said deflecting device to direct the coolant stream against the work at the point of honing contact.

11. In a grinding machine, the combination of a work support, a rotary work holder thereon, a grinding wheel, a grinding wheel support, means for effecting relative positioning movements of said supports between grinding and relatively separated positions, a honing attachment located on the grinding wheel support to be rendered operative for a relatively separated position of said grinding wheel and work holder, said honing attachment comprising a vibratory honing element and a housing for the same movable on the grinding wheel support into and out of work engaging contact, a coolant supply device including a nozzle on the grinding wheel support for directing a coolant stream against the grinding wheel, a device for deflecting the coolant stream movably supported on the grinding wheel support, and a connection between the coolant deflecting device and housing whereby movement of the housing and honing element to work contacting position positions the coolant deflecting device to direct the coolant stream against the work at the point of honing contact.

12. In a grinding machine, the combination of a work support, a rotary work holder thereon, a grinding wheel, a grinding wheel support, means for effecting relative positioning movements of said supports between grinding and relatively separated positions, a honing attachment located on the grinding wheel support to be rendered operative for a relatively separated position of said grinding wheel and work holder, said honing attachment comprising a vibratory honing element and a housing for the same movable on the grinding wheel support into and out of grinding wheel contact, a coolant supply device including a nozzle on the grinding wheel support for directing a coolant stream against the grinding wheel, a coolant deflecting plate and pivotal supporting means on the wheel slide on which the deflecting plate is movable into and out of position to deflect the coolant stream, and a connection between the deflecting plate and housing, said connection having provision for adjustment in accordance with the diameter of the work whereby movement of the housing and honing element into work engaging contact will position the deflecting plate to direct the coolant stream against the work at the point of honing contact.

13. In a grinding machine, a work support, a rotary work holder thereon, a grinding wheel and a grinding wheel support, and means for effecting relative translatory movements and transverse positioning movements of said supports between grinding and relatively separated positions, power means for effecting said relative translatory movements, a honing device comprising a honing element and means for imparting vibratory movements thereto, and a control system for the machine including a manually operable power control and connections therefrom for rendering said power means operative and inoperative to effect said relative translatory movements for grinding, and a honing control and connections therefrom operable to start and stop the honing device and simultaneously to start and stop said relative translatory movements.

14. In a grinding machine having a work support, a rotary work holder thereon, a grinding wheel and a grinding wheel support, and means for effecting relative translatory movements and transverse positioning movements between grinding and relatively separated positions of said supports, power means for effecting said relative translatory movements, a honing attachment located on the grinding wheel support to be rendered operative in the separated position of said supports, said honing attachment comprising a vibratory honing element, actuating means for the honing element, and a housing movable with the honing element into and out of work engaging contact, a manually operable control for moving the housing, and control means actuated automatically concurrently with movement of the housing and honing element into and out of work engaging contact to render said vibratory means and said power means for effecting relative translatory movements operative and inoperative.

15. In a grinding machine, a work support, a rotary work holder thereon, a grinding wheel and a grinding wheel support, and means for effecting relative translatory movements and transverse positioning movements of said supports between grinding and relatively separated positions, power means for effecting said relative translatory movements, a honing device comprising a honing element and means for imparting vibratory movements thereto, and a control system for the machine including a honing control and connections therefrom operable to start and stop the honing device, and a manually operable power control and connections therefrom having alternative start and stop positions and connections shiftable thereby for rendering said power means operative and inoperative to effect said relative translatory movements, and having an additional honing control position and connections rendered operative in said honing control position of the power control to cause the honing control to start and stop said relative translatory movements simultaneously with the starting and stopping of the honing device.

16. In a grinding machine having a work support, a rotary work holder thereon, a grinding wheel and a grinding wheel support, and means for effecting relative translatory movements and transverse positioning movements between grinding and relatively separated positions of said supports, power means for effecting said relative translatory movements, a honing device comprising a honing element and means for imparting vibratory movements thereto, and an electrical control system for the machine including a manually operable honing control element, and switch connections actuated thereby to start and stop operation of the honing device, a manually operable power control having alternative start and stop positions and switch connections shiftable thereby for rendering said power means operative and inoperative to effect said relative translatory movements, and having a honing control position and switch connections operative for said latter position to cause the honing control element to start and stop said relative translatory movements simultaneously with the starting and stopping of the honing device.

17. In a grinding machine having a work support, a rotary work holder thereon, a grinding wheel and a grinding wheel support, hydraulically operated means including a fluid motor actuable for effecting relative translatory movements of said supports, and a start and stop valve for said fluid motor, a honing device comprising a honing element and means for imparting vibratory movements thereto, a manually operable honing control element operable to start and stop the operation of the honing device, and actuating connections for said start and stop valve controlled by movement of said manually operable element to start and stop said relatively translatory movement simultaneously with the starting and the stopping of the honing device.

18. In a grinding machine having a work support, a rotary work holder thereon, a grinding wheel and a grinding wheel support, hydraulically operated means including a fluid motor actuable for effecting relative translatory movements of said supports, and a start and stop valve for said fluid motor, a solenoid connected to shift said valve, a honing device comprising a honing element and means for imparting vibratory movements thereto, a manually operable honing control operable to start and stop operation of the honing device, and switch connections with the solenoid controlled by said honing control for shifting said valve to start and stop said translatory movements simultaneously with the starting and stopping of the honing device.

19. In a grinding machine having a work support and a rotary work holder thereon, a grinding wheel, a grinding wheel support, and means for effecting relative translatory movements and transverse positioning movements between grinding and relatively separated positions of said supports, including a fluid motor for effecting said translatory movements, a honing attachment located on the grinding wheel support for engagement with the work in said relatively separated position of said supports comprising a honing element, means for imparting a vibratory movement to the honing element, and supporting means on which the honing element is movable between work contacting and retracted positions, a start and stop valve for the fluid motor, manually operable control means for moving the honing element into and out of work engaging position, and actuating means for the valve including electrical connections controlled automatically concurrently with movement of the honing element to and from said work contacting position to start and stop said vibratory movement and simultaneously to shift said valve between start and stop positions.

20. A grinding machine having a reciprocable work support, a rotary work holder thereon, a grinding wheel, and a grinding wheel support movable toward and away from the work support, a hydraulic operating system for the work support including a fluid motor for reciprocating the work support, and a start and stop valve for said fluid motor, a cross feed rapid movement for moving the grinding wheel support between grinding and retracted positions, a honing attachment located on the grinding wheel support for engagement with the work in the retracted position of the grinding wheel support, said honing attachment comprising a honing element and actuating means therefor, electrical operating means for shifting the start and stop valve, and an electrical operating control system adapted for operating the machine in accordance with a plurality of manual and automatic cycles including a manually operated power control for the work support and switch connections actuated thereby having alternative start, stop and honing controlled positions, and a manually operable honing control for the machine and switch connections actuated thereby for starting and stopping the vibratory movement of the honing device, and for the honing controlled position of the power control to simultaneously shift said valve between start and stop positions.

21. In a grinding machine having a reciprocable work support, and a rotary work holder thereon, a grinding wheel, a grinding wheel support movable toward and away from the work, a hydraulic operating system including a fluid motor for reciprocating the work support, a cross feed fluid motor for imparting cross feeding movements to the grinding wheel support, a cross feed selector valve for said cross feed fluid motor having operating and stop positions, and a start and stop valve for said fluid motors, a cross feed rapid movement for the grinding wheel support including a cross feed electric motor, coolant supply means including a coolant electric motor, work holder rotating means including a headstock electric motor, electrical operating means for shifting said start and stop valve, and an electrical control system for the machine including individual manual controls for each of said start and stop valve, rotary work holder, and cross feed rapid movement, a manually operable automatic control for simultaneously controlling all of said electrical motors and electrical operating means independently of said individual manual controls, and a selector device for rendering said automatic control operative and inoperative.

BENJAMIN P. GRAVES.
HANS CARL WEIMAR.